United States Patent
Sharan et al.

(10) Patent No.: US 9,030,416 B2
(45) Date of Patent: May 12, 2015

(54) DATA ENTRY SYSTEM AND METHOD OF ENTERING DATA

(71) Applicant: Nuance Communications, Inc., Burlington, MA (US)

(72) Inventors: Santosh Sharan, Acton, MA (US); Graham Dodgson, Buckinghamshire (GB)

(73) Assignee: Nuance Communications, Inc., Burlington, MA (US)

(*) Notice: Subject to any disclaimer, the term of this patent is extended or adjusted under 35 U.S.C. 154(b) by 0 days.

(21) Appl. No.: 14/220,010

(22) Filed: Mar. 19, 2014

(65) Prior Publication Data

US 2014/0204031 A1    Jul. 24, 2014

Related U.S. Application Data

(63) Continuation of application No. 13/914,577, filed on Jun. 10, 2013, now Pat. No. 8,717,299, which is a continuation of application No. 12/091,700, filed as application No. PCT/GB2007/050338 on Jun. 14, 2007, now Pat. No. 8,462,118.

(30) Foreign Application Priority Data

Jun. 19, 2006  (GB) .................................. 0612113.1
Apr. 30, 2007  (GB) .................................. 0708284.5

(51) Int. Cl.
  *G06F 3/02*     (2006.01)
  *G06F 3/023*    (2006.01)
  *G06F 3/0488*   (2013.01)

(52) U.S. Cl.
  CPC ............ *G06F 3/0233* (2013.01); *G06F 3/0237* (2013.01); *G06F 3/04886* (2013.01)

(58) Field of Classification Search
  CPC .................. G06F 3/04886; G06F 3/023–3/027
  USPC ................ 345/157–162, 168–169, 171–178; 715/700–866
  See application file for complete search history.

(56) References Cited

U.S. PATENT DOCUMENTS 4,476,462  A     10/1984  Feldman
5,818,437  A  *  10/1998  Grover et al. ................. 715/811

(Continued)

FOREIGN PATENT DOCUMENTS

EP       1555601 A2     7/2005
WO    WO-9946563 A1     9/1999

OTHER PUBLICATIONS

Exam Report for Application GB0708284.5, Mail Date Apr. 1, 2011, 5 pages.

(Continued)

*Primary Examiner* — Gene W Lee
(74) *Attorney, Agent, or Firm* — Perkins Coie LLP

(57) ABSTRACT

A method and apparatus for entering words into a computer system. Letters contained in a desired word are entered by giving approximate location and directional information relative to any specified keyboard layout. The inputs need not correspond to specific keys on the keyboard, a sequence of ambiguous key entries corresponding to individual words can be used to retrieve a word from the dictionary. The system tracks directional information of movement relative to a/the specific keyboard layout, reducing it to predetermined primary directions and translates this seemingly ambiguous information into accurate words from the dictionary. The system may also capture the user's intention (with regard to text entry) by observing the movements on the keyboard.

21 Claims, 8 Drawing Sheets

(56) References Cited

U.S. PATENT DOCUMENTS

| | | |
|---|---|---|
| 6,037,942 A | 3/2000 | Millington |
| 6,307,549 B1 | 10/2001 | King et al. |
| 6,378,234 B1 | 4/2002 | Luo |
| 6,567,072 B2 | 5/2003 | Watanabe |
| 6,580,414 B1 | 6/2003 | Wergen et al. |
| 6,587,132 B1 | 7/2003 | Smethers |
| 6,801,659 B1 | 10/2004 | O'Dell |
| 6,952,597 B2 | 10/2005 | Graham et al. |
| 6,972,748 B1 | 12/2005 | Lang |
| 6,982,658 B2 | 1/2006 | Guo |
| 7,145,554 B2 | 12/2006 | Bachmann |
| 7,171,498 B2 | 1/2007 | Tu et al. |
| 7,453,439 B1 | 11/2008 | Kushler et al. |
| 7,706,616 B2 | 4/2010 | Kristensson et al. |
| 8,462,118 B2 | 6/2013 | Sharan et al. |
| 2004/0104896 A1 | 6/2004 | Suraqui |
| 2004/0120583 A1 | 6/2004 | Zhai |
| 2004/0140956 A1 | 7/2004 | Kushler et al. |
| 2005/0043871 A1 | 2/2005 | Endo et al. |
| 2005/0061638 A1 | 3/2005 | Sugimura et al. |
| 2005/0140650 A1 | 6/2005 | Lang |
| 2005/0190973 A1* | 9/2005 | Kristensson et al. ......... 382/229 |
| 2006/0028450 A1 | 2/2006 | Suraqui |
| 2006/0176283 A1 | 8/2006 | Suraqui |
| 2008/0158162 A1 | 7/2008 | Ahn |

OTHER PUBLICATIONS

International Preliminary Report on Patentability from corresponding International Application No. PCT/GB2007/050338, dated Sep. 30, 2008, 10 pages.

International Search Report and Written Opinion from corresponding International Application No. PCT/GB2007/050338, dated Apr. 21, 2008, 14 pages.

* cited by examiner

An example coding scheme (4 directions)

Entering the word CLEVER on a Qwerty keyboard

```
    U
    ↑
L ←-C-→ R
    ↓
    D
```

| User Taps (sample) | Code | |
|---|---|---|
| 1 — C tapped | C | (start) |
| 2 — L tapped | CU | (up) |
| 3 — E tapped | CUU | (up) |
| 4 — V tapped | CUUD | (down) |
| 5 — E tapped | CUUDU | (up) |
| 6 — R tapped | CUUDUR | (right) |
| | Maps to | "CLEVER" |

Figure 6.

DATA ENTRY SYSTEM AND METHOD OF ENTERING DATA

CROSS-REFERENCE TO RELATED APPLICATIONS

This application is a continuation of U.S. patent application Ser. No. 13/914,577, filed Jun. 10, 2013, now U.S. Pat. No. 8,717,299; which is a continuation of U.S. patent application Ser. No. 12/091,700, filed Apr. 25, 2008, now U.S. Pat. No. 8,462,118; which is a U.S. National Phase of International Application PCT/GB2007/050338, filed Jun. 14, 2007, which claims priority to British Application No. 0708284.5, filed Apr. 30, 2007 and British Application No. 0612113.1, filed Jun. 19, 2006.

BACKGROUND

The field of this invention is related mostly to text entry into a computer system, particularly to handheld computers and personal digital assistants (PDAs), mobile phones and television sets and other electronic and computer based devices. More specifically it improves some of the existing methods to disambiguate user entry on a regular or miniaturized keyboard. The proposed solution also uses novel data inputs (such as directional information) to successfully retrieve the required word from the dictionary.

Text input is an important task for the computer user. The QWERTY keyboard is the most common text entry device on a desktop computer. Mobile electronic devices such as PDAs and mobile phones do not usually have space for full QWERTY keyboards and, with their widespread adoption, the need for improved text entry on devices with limited keypads and small screen size has emerged.

In the case of mobile phones, text entry is normally accomplished using numerical keys as surrogates for letters. In the typical arrangement each key corresponds to 3 or more letters or punctuation marks, selection of the correct letter requiring multiple depressions of the same key, which can be time consuming. This disadvantage is exacerbated when using less common words, the letters of which may require a greater number of depressions of the same key. This situation is improved somewhat by the common practice of using "predictive" text entry where the most likely letters in a given word are inferred by the software, reducing the letter choice options at any given point in entering a word. This method of text entry is becoming more cumbersome with the expanding applications of more sophisticated mobile phones to the extent that some smartphones incorporate full, albeit rather small, QWERTY keyboards. However operating miniature keyboards by hand is difficult as the spaces between keys and the keys themselves are often smaller than the operator's finger. This limits the minimum size one can practically make a physical QWERTY keyboard. The smaller the keyboard the more likely there will be data entry errors. A method is needed to cope better with the inevitable ambiguity and errors in entering data on small or limited keyboards, beyond predictive text entry.

An alternative to finger operation of reduced-size keyboards is the operation by stylus on virtual keyboards, which are now available in devices such as PDAs. Virtual keyboards can be displayed on a screen, whereby letters can be entered by tapping the appropriate key or symbol with the stylus. The keyboard provided on the screen is typically the familiar QWERTY layout. Nevertheless, stylus keyboarding requires intense concentration, is slow compared to using a full keyboard and, like physical miniature keyboards, is likely to result in many entry errors.

Other improvements in text entry on mobile devices have concentrated on individual letter input e.g. handwriting recognition software, which is common on PDAs and on Tablet PCs, but tends to be slower than keyboard entry for many people. There are also other stylus/keyboard letter selection mechanisms that have been developed such as the Unistrokes alphabet, where every letter is written with a single stroke, but the more frequent ones are assigned simpler strokes.

It is important to not to rely on accurate entry of all the letters in a word if speed of text entry is to be improved beyond using a stylus to tap each letter on a virtual keyboard.

An example of recent improvements to word entry on a virtual keyboard is provided by a system from IBM (U.S. Pat. No. 7,251,367). This is a system that recognizes words by the shape that is made by a stylus as it passes through the letters on a virtual keyboard. This shape is matched to a list of stored word patterns. The system requires a certain level of training and significant computing calculations to match patterns and to cope with errors. Such systems often have a significant processing requirement and may be subject to slow response times. Moreover, systems of this kind sometimes have a relatively low tolerance for error beyond which the word simply cannot be recognized. Such systems are based on recognizing words from a pattern traced out on an input device, rather than the actual keys activated. However, such systems use patterns based on omnidirectional movements ie the patterns are complex because each element of movement can take place in an infinity of directions. The systems are capable of accurately identifying intended words, but maintain a high volume of information at all stages of data processing. This may be onerous on limited processing resources, especially in small devices such as mobile telephones and PDAs.

It is therefore an objective of the current invention to provide a text input system that overcomes all of the above technical shortcomings. In fact simpler patterns are adequate input for data entry and word recognition and the current invention is based on this concept, i.e. it is unnecessary to track omnidirectional patterns. It reduces the information derivable from tracking key movements, thus initially providing relatively low accuracy in word identification. The system may then compensate for inaccuracies by applying supplementary disambiguation techniques.

The text input system reduces the need to be accurate when entering text, improving the utility of small keypads and which leverages user knowledge of and familiarity with existing keyboard layouts such as the QWERTY keyboard.

A further advantage of the invention is that it will also allow the use of limited e.g. numeric keypads as efficient surrogates of full QWERTY keypad layouts allowing application in small electronic devices such as mobile phones and consumer electronic devices such as TV remote controls.

SUMMARY

Accordingly, the present invention provides a data entry apparatus comprising: a data input means, having a plurality of keys; a means for tracking consecutive activations of the keys, a plurality of translational movements between the consecutive activations forming a pattern, each translational movement being defined by one of a predetermined group of primary directions; a means for identifying the pattern of translational movements; a storage means for storing a plurality of predefined patterns of translational movements, defined in terms of the primary directions, each pattern corresponding to a word; a processing means for comparing the identified pattern of translational movements with the stored patterns and for identifying candidate words based on matches between the identified patterns and the stored patterns; an output means for outputting the candidate words.

The data input means may be a real physical keyboard or a virtual keyboard means for generating a virtual keyboard on a screen and receiving actuations of the keys. It may be divided into regions of associated keys, translational movements being further defined by primary directions between consecutively actuated regions or between consecutive actuations in the same region. The regions may be individual rows of keys or individual columns of keys or groups of adjacent keys or any other suitable grouping. The regions may overlap. Where a keyboard is used it may be a QWERTY keyboard with keys are divided into three rows.

The primary directions may be a set of directions reduced with respect to the set of all directions and may be, for example, the primary directions are up, down, left and right.

The system may also advantageously have an actuation means for actuating the keys: this may be a stylus, a mouse, a joystick, trackpad, trackerball, a numeric keypad, i-pod type device or a force feedback joystick. In one embodiment the actuation means may comprise a stylus and the tracking means is a position and/or movement transmitter provided on the stylus. The actuation means may be remote from the data input means. Alternatively, the keys may be actuated directly by the operator's hand or finger In a further embodiment of the data entry system the system may include a touch sensitive screen for displaying the data input device and the system includes a contact recognition system for recognising when the actuation means is in contact with the screen, thereby facilitating the recording of the position of the stylus over the keyboard. The system may use voice commands to displace the actuation means.

The tracking means may include tracking the actuating means during the course of a the translational movement and, based on this tracking, predicts the translational movement before it is completed. It may comprise means for tracking the operator's finger during the course of a the translational movement and, based on this tracking, predicts the translational movement before it is completed.

The data input device may be touch sensitive

In an embodiment of the invention there is also a selection means for receiving a user selection from the output candidate words. Advantageously, the system may also include a user profile means for storing past inputs by a user and generating a user profile for use in predicting words. There may also be a ranking means for assigning ranks to the candidate words, according to the proximity of the pattern match.

In a further embodiment of the invention there is provided a method of entering data into a data input means having a plurality of keys comprising the following steps: inputting data by actuating the keys, tracking consecutive actuations of the keys, a plurality of translational movements between the consecutive actuations forming a pattern, each translational movement being defined by one of a predetermined group of primary directions; identifying the pattern of translational movements; storing a plurality of predefined patterns of translational movements, defined in terms of the primary directions, each pattern corresponding to a word; comparing the identified pattern of translational movements with the stored patterns; identifying candidate words based on matches between the identified patterns and the stored patterns; outputting the candidate words.

Data may be input into a keyboard or into a virtual keyboard means for generating a virtual keyboard on a screen and receiving actuations of the keys. According to one embodiment of the inventive method, data is input into regions of associated keys of the data input means, translational movements being further defined by primary directions between consecutively actuated regions or between consecutive actuations in the same region. The regions may be individual rows of keys, individual columns of keys or groups of adjacent keys and the regions may overlap. The primary directions may be up, down, left and right. According to one method embodying the invention data is input into a QWERTY keyboard, with keys divided into three rows.

The input device may be touch sensitive.

Advantageously the keys may be actuated by an actuating means, which may comprise one of a stylus, a mouse, a joystick, trackpad, trackerball, a numeric keypad, i-pod type device or a force feedback joystick or, alternatively, a stylus and the tracking means is a position and/or movement transmitter provided on the stylus. The actuation means may be remote from the data input means. In another embodiment of the invention the actuation means is displaced using voice commands. Alternatively the keys may be actuated directly by the operator's hand or finger.

The user may input into a touch sensitive screen for displaying the data input device and the system includes a contact recognition system for recognising when the actuation means is in contact with the screen, thereby facilitating the recording of the position of the stylus over the keyboard.

In a further embodiment of the invention the system tracks the actuating means during the course of the translational movement and, based on this tracking, predicting the translational movement before it is completed or during the course of a the translational movement and, based on this tracking, predicting the translational movement before it is completed.

Advantageously the method may include selecting a word from the output candidate and inputting the selection. It may also include storing inputs by a user and generating a user profile for use in predicting words. The candidate words may be ranked by assigning ranks according to the proximity of the pattern match.

In a further embodiment of the invention the method and apparatus are fully automated in a computer system. A computer program product comprises a readable storage medium for storing computer readable instructions for implementing the method as herein described.

DETAILED DESCRIPTION

The invention provides a new form of text entry system that allows the capture of directional information on a keyboard layout and then uses the information so obtained to retrieve the desired word from a storage means eg a dictionary. In the invention the user enters a word on a regular keyboard layout, but with little or no regard to the absolute position of the individual keys, the invention being based on the relative position of consecutive keys. Actuation of one key followed by actuation of another key represents a translational movement between the two keys. This and subsequent translational movements together form a pattern of translational movements and it is the pattern of translational movements, rather than the keys actually actuated, which is interpreted by the invention as a natural word.

The invention advantageously uses a proprietary coding technique to encode the user inputs with regard to the translational movements ie the directions of one key relative to another when actuated sequentially by the user.

The translational movements are preferably coded within a set of predetermined primary directions, these being a reduced set of all possible directions which can be taken between two consecutive key actuations. One example of the reduced set would be the four directions: "up", "down", "left" and "right". Thus, rather than registering each translational movement according to the actual direction taken, the system preferably assigns one of the reduced set. For example, if the actual direction of movement between two actuations is 10° off vertical, the transitional movement would be assigned, for example to "up", this being the closest of the primary to a real 10° heading.

Reducing possible directions from an infinite number to a small number, such that all translational directions are categorised within a reduced group, eg to "up", "down", "left" and "right", means that many disparate translational directions will be assigned the same primary direction. For example, all movements with a bearing up to ±44° could be assigned the same primary direction "up". Moreover, this will include translational movements with the same actual bearing, but with completely different starting points, such that the same vertical movement occurring at many different points on the keyboard could all be represented simply by "up".

Thus, many translational movements can be represented by the same primary direction. By extension, differing patterns of actual translational movements on the keyboard, when coded into the primary directions, may be represented by the same patterns, as a consequence of the primary directions being based on a reduced set of directions.

Further details of the encoding are set out in a later part of this description.

The encoded information is periodically matched with all the hash codes from the storage means in a predictive fashion and candidate words corresponding to the encoded pattern. Clearly, with each additional keystroke, the pattern is extended and the number of candidate words decreases. Thus, the system reduces ambiguity of the word as it is being entered: as more letters of the word are entered the encoded pattern increases in complexity and the ambiguity correspondingly decreases. Approximate positional information for each key can optionally be used to further reduce ambiguity and improve accuracy.

Since the proposed system uses directional information and does not need to make use of the absolute position of the keys, it can easily be adapted to enter text in devices with very small form factors such as small screen mobile phones or wrist watches.

The proposed system will work with physical or virtual keyboard layouts. In the latter case a stylus is usually used to enter data on a keyboard typically displayed on a mobile phone or PDA screen.

The high tolerance to ambiguity of the system also allows for the use of a limited keypad, as found on a mobile phone or TV remote control, as a surrogate for a full QWERTY keyboard.

The design of the system is based on the following principles:

Humans are fairly good with haptic memory, hence the assumption is that over time they get better at remembering the 'approximate' location of the keys on a certain keyboard layout (e.g. QWERTY). In other words after repeated usage a user might be able to 'approximately' point out where the different keys are without having to look at the keyboard.

An efficient text entry mechanism should be able to use the 'approximate' location(s) of the key(s) selected by the user as sufficient information to retrieve the desired text The intention of a user to move in a certain direction on a keyboard is valuable information that can be used for text entry There are different ways this directional 'intention' can be captured over a keyboard layout. One way to capture the 'intention' of the user with regard to text entry is to notice which direction the user's finger is moving on a regular keyboard and run through all possible matches in that direction within a dictionary. For instance assume the current letter entered is 'H'. If the user shows the inclination to move to the left (in the same row of a QWERTY keyboard) then it is obvious that the next letter is 'A' (based on an English dictionary) as all the other letters in between will not result in a successful match.

An efficient predictive mechanism including some probabilistic techniques can be applied to use the ambiguous information to result in fairly accurate matches. The accuracy of such a match improves with word lengths i.e. the longer the word the less the ambiguity and the more forgiving the method.

We have called the system and method of text and data entry of the current invention, as described in this document, PriText.

The present invention will now be more particularly described by way of example only with reference to the attached drawings, in which.

Figure 5:
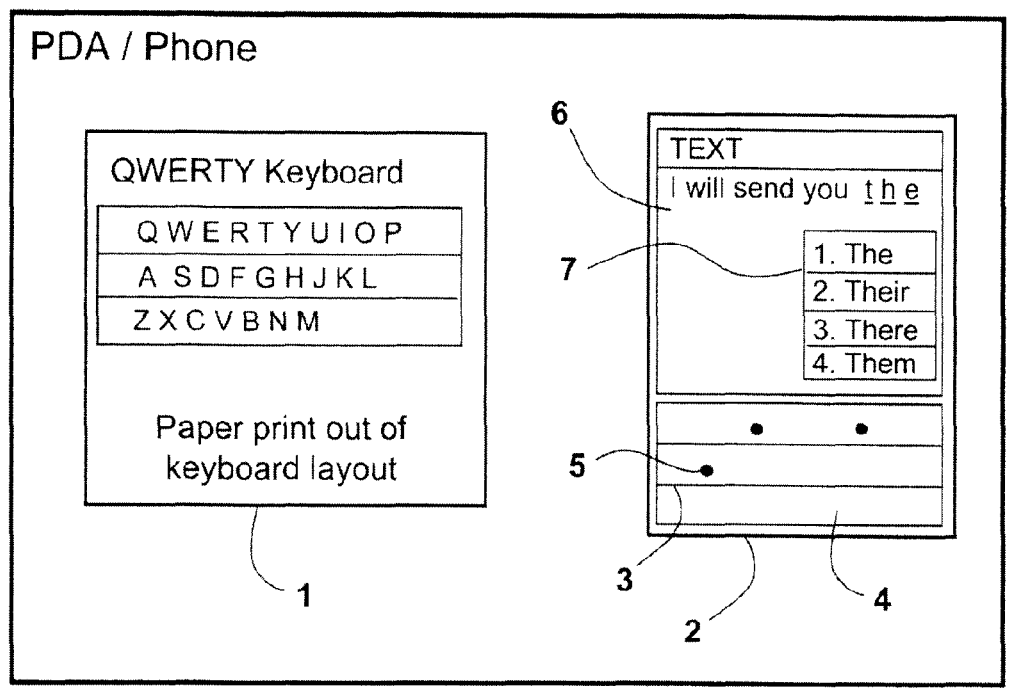
Figure 7A:
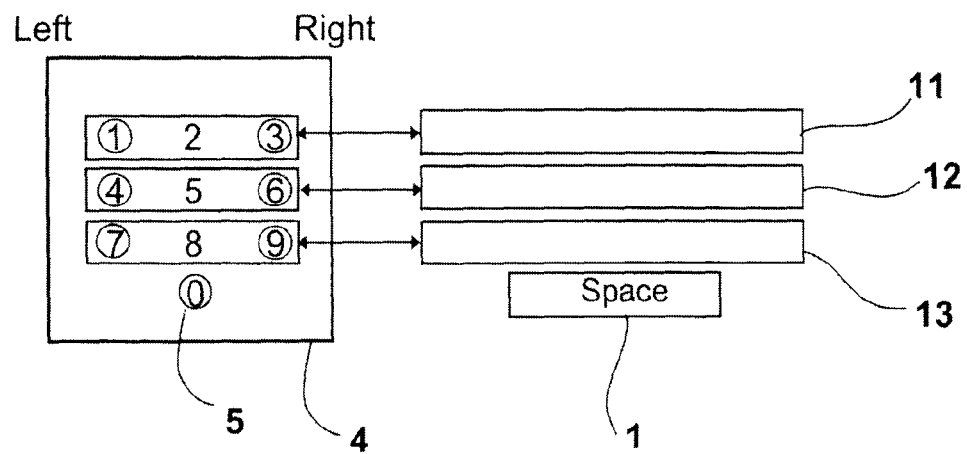
Figure 7B:
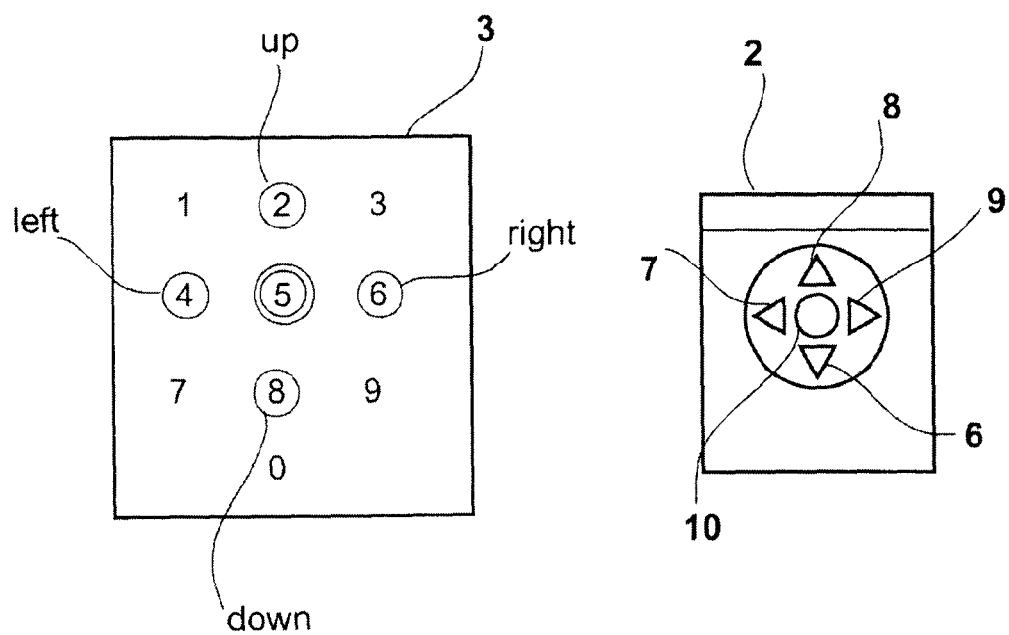
Figure 8:
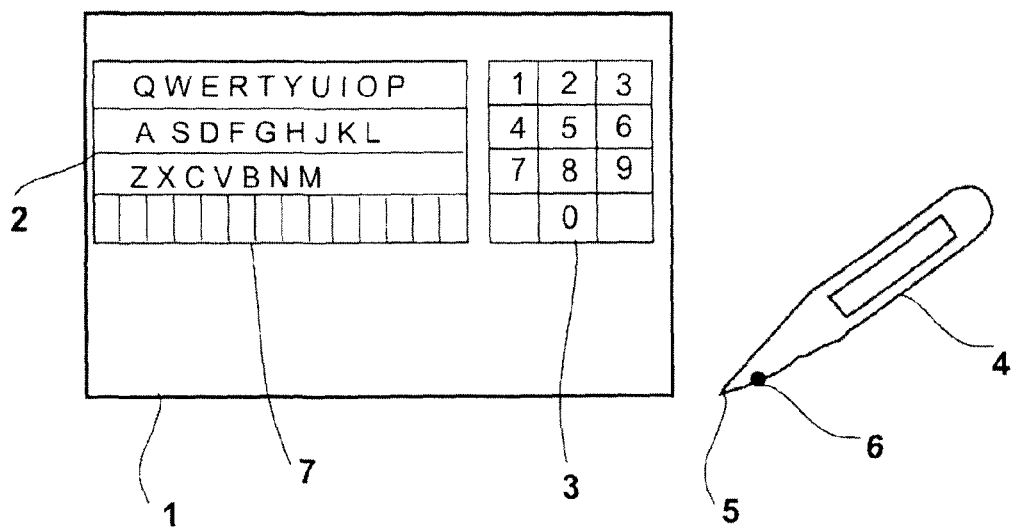
Figure 8:
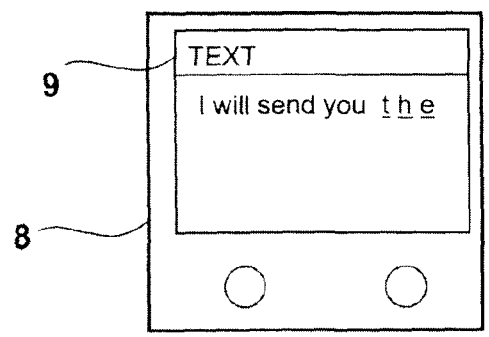

The text is being entered using the directional keys of an existing remote control;

FIG. 5 demonstrates how this system can be used when there is no keyboard representation on the device (PDA or mobile phone) itself. The keyboard representation can be outside the device and available to be used as a visual aid;

FIG. 6 illustrates how the word 'clever' can be encoded in real time using a simple directional based encoding. The figure illustrates how such an encoding scheme can allow for simple string based matches for predictive entry;

FIGS. 7A and 7B show how a limited keypad (such as the ones found in mobile phones and TV remote controls) can be used for text entry; and FIG. 8 depicts a system where an electronic pen containing a small camera is used to enter data into a Computer using a paper printout of a keyboard layout.

The invention is suitable for improving text entry on electronic devices, as will be appreciated from the following.

Figure 1:
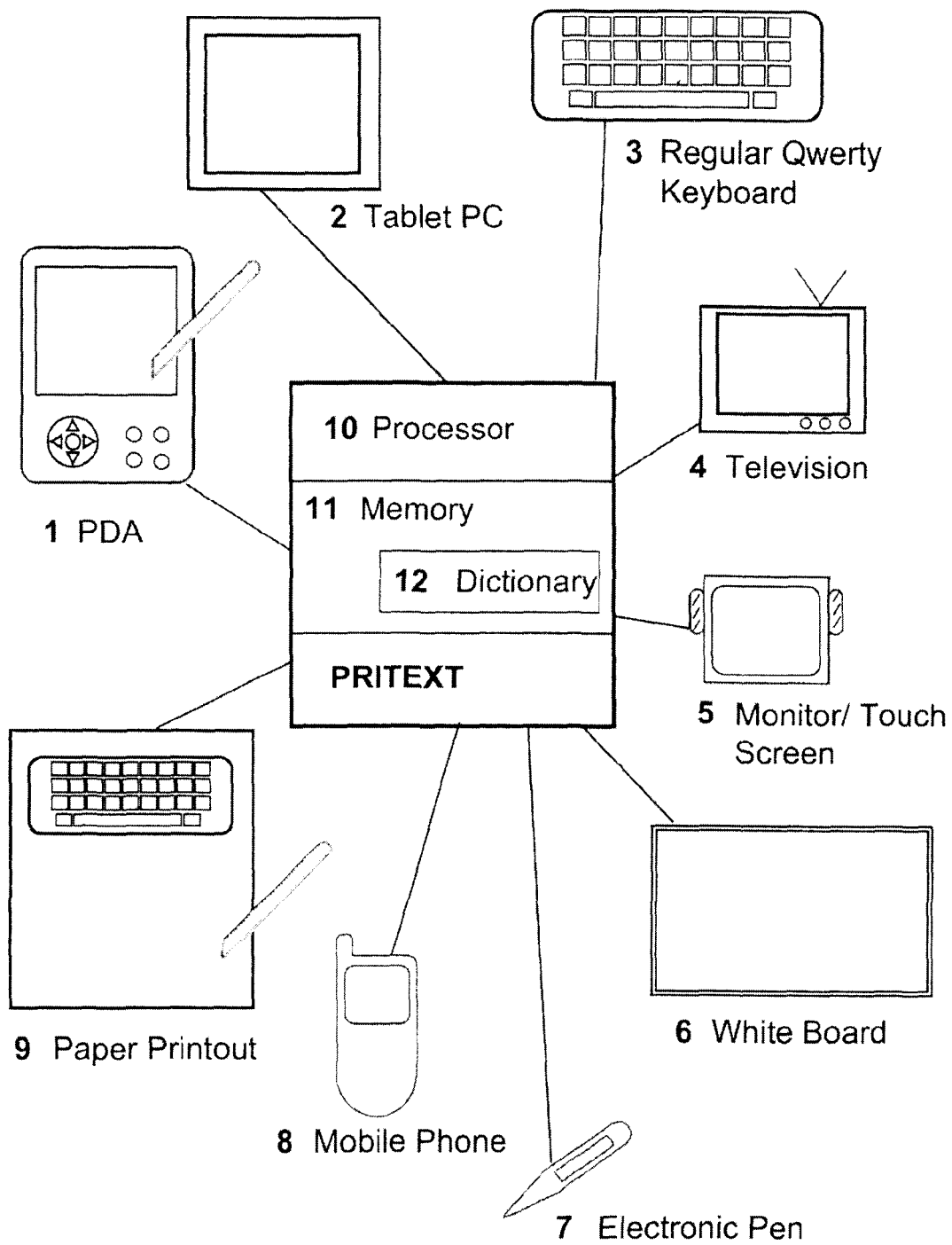
FIG. 1 is a schematic illustration of the various environments where the invention can be used.

Referring now to the drawings in general, but particularly to FIG. 1, which shows examples of the most likely applications of the invention. The apparatus comprises a processor (10) for implementing the tracking and matching. The processor can be a separate computer integrated circuit or an existing processor in the device (e.g. the processor in a mobile phone), memory (11) to store the program and directional and positional information received from the input devices (1 to 9). The apparatus also contains a storage means (12) such as a word dictionary (12) which may be a separate memory module or part of the existing memory in the arrangement. This storage means stores encoded word data and is used to match with encoded data from the input device to allow the selection of the most likely word possibilities. The system according to the invention may take input from many different devices, each of which may contain apparatus elements or may perform method steps as defined herein. FIG. 1 shows the most likely options which include a handheld computer, such as a personal digital assistant (1), a tablet PC (2), a standard computer QWERTY keyboard (3), a television (4), a touch screen monitor (5), an electronic whiteboard (6), an electronic pen (7) which can store and transmit movement and positional information to the system according to the invention, a mobile phone (8), a passive paper printout of a keyboard layout used in association with an electronic pointing device (9).

The keys themselves may be touch sensitive or require depression for actuation. Where keys are neither touch-sensitive nor depressible, actuation of a key may occur on actuation of a further input means within an actuating means, such as a button on a joystick. The actuating means, whether it has a further input means or not, may be a stylus, a mouse, a joystick, trackpad, trackerball, a numeric keypad, i-pod type device or any suitable device, and the system may further have a tracking means which tracks the position of the actuation means at all times, not just at moments of actuation. Alternatively there may be no separate actuation means, keys being directly actuated by the user's normal operation upon the keyboard, applying enhanced pressure when key actuation is required. The tracking means may track the operator's finger at all times including moments of actuation, or, alternatively, if based on key depression may register finger positions only at moments of key actuation.

This keyboard can be of any size, any layout and in any language. The keyboard may be a physical keyboard as found on a PC or some mobile phones and portable devices, a virtual keyboard displayed on an electronic screen, a picture of a keyboard on a sheet of paper, or a representation of a keyboard on a whiteboard. The relative movement of the tracking device is monitored to give information about the direction of each letter in a word from the previous letter. The position and directional information of the actuating means or operator's finger is encoded so it can be compared with a stored encoded dictionary of words, and a match determined.

Figure 2:
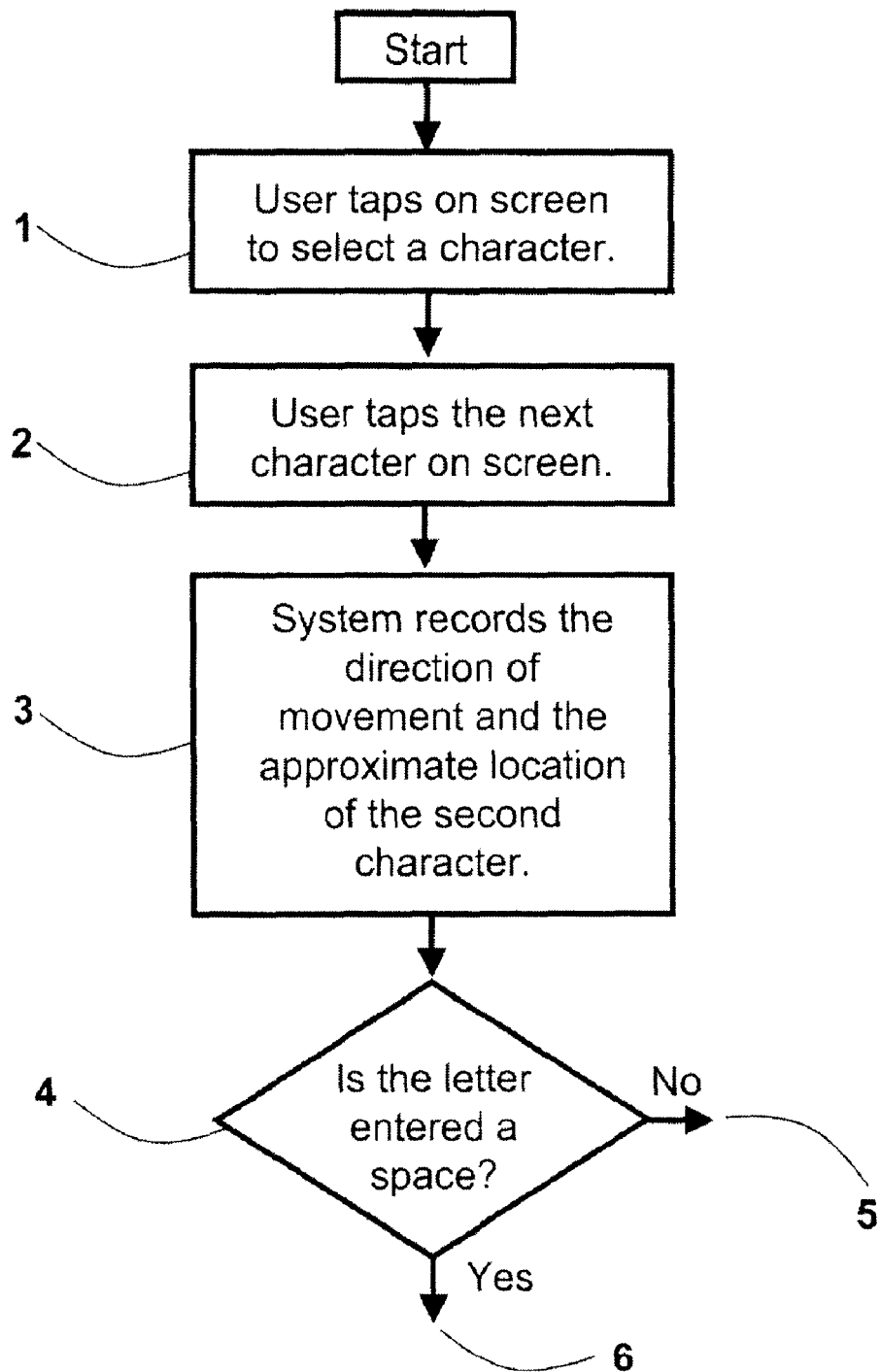
FIGS. 2 and 3 represent a process flowchart that illustrates a preferred method of operation of the word recognition system of the current invention.
Figure 3:
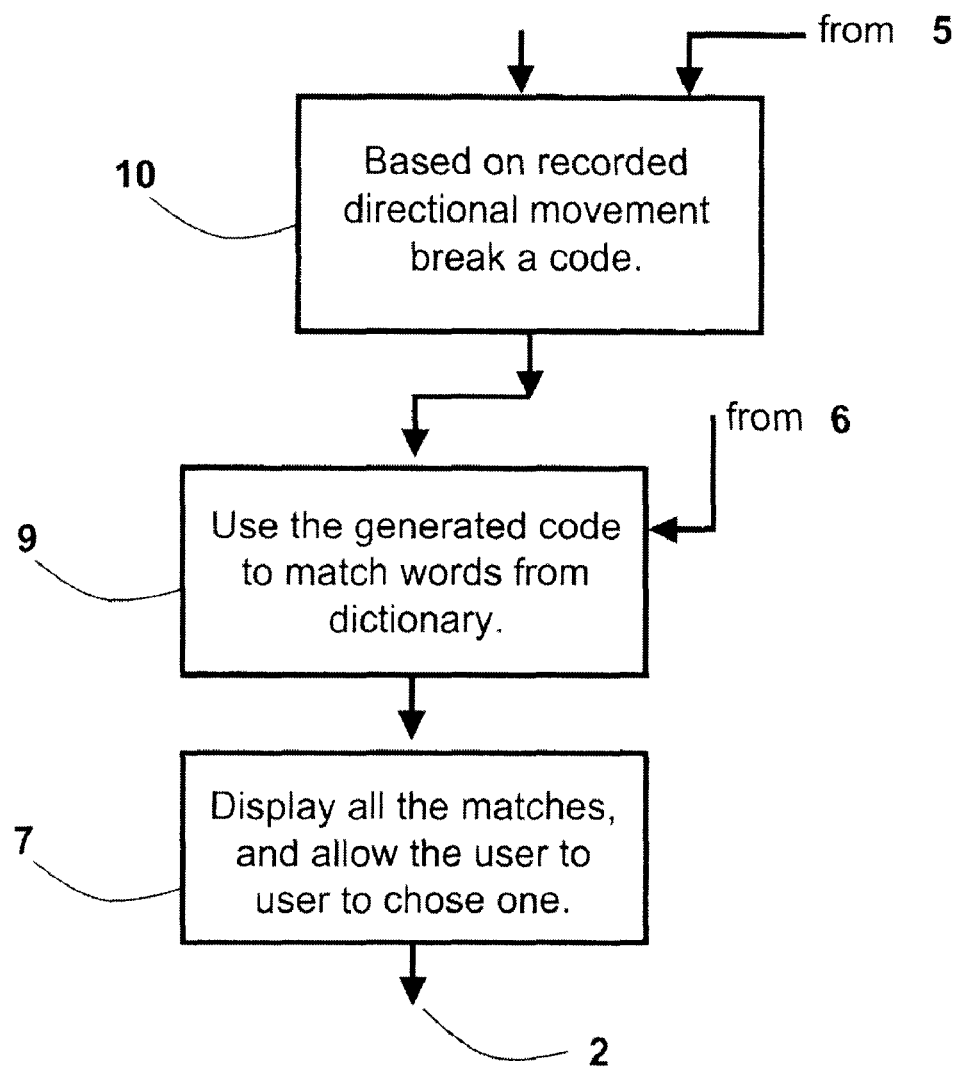

FIG. 2 and FIG. 3 illustrate a possible flow chart for this word selection process. For example, consider an embodiment in which the input device is a PDA and the actuation device is a stylus then at FIG. 2 (1) the user uses the stylus to tap on an image of a keyboard on the PDA screen to select a particular character. The user then taps the next character. The system records and processes the direction of movement from one character to the next and the approximate location of the current character 3. If the last character entered was a space (4) then the system assumes a full word has been entered 6 and the method can move to step (9) described later. If the last character was not a space then the system creates a code based on the stored directional movement (10), and this code is used to match with similar codes stored in the storage means (9). All the matches are displayed (7) to the user to allow selection of the correct word—often before the full word is entered.

The system requires that the layout of the keyboard, eg QWERTY, be known. As stated above, the tracking means may monitor the position of the actuation means or operator's finger at all times or merely at moments of key actuation. In embodiments where the tracking occurs at all times (not just at moments of actuation) the movement following a key actuation before the next actuation occurs may be tracked and utilised by the system to anticipate the key which the user intends to actuate. Thus, the matching process described above may be based also on encodings of anticipated keys, such that candidate words can also be suggested while the next key for actuation has still not been actuated.

The encoding using a reduced set of primary directions of translational movements will be described now in detail. Taking again the example in which the system operates with 4 primary directions, e.g. up, down, left, right, then each word in the storage means or dictionary can be represented by a string of characters defining the direction of the next letter in the word from the current letter. As the actuation means or the operator's finger is moved from one part of the keyboard to the next the processor searches the list of word strings in the storage means to find all matches. The processor utilises a matching method for selecting and calling up stored words, comparing the encoded word data from the storage means with that provided by the tracking means, identifying the best match candidates and rendering the corresponding real words on a display screen for the operator to make a selection.

According to the proximity of the stored word to that provided by the tracking means and the context of word, the best match candidates may be ranked and the ranking may be communicated to the operator.

The apparatus may also comprise a means for selecting candidate words, possibly based on rankings, and means for receiving user selection of a particular candidate.

The operator has the option of overriding all the suggestions provided by the matching process and imposing another real word, irrespective of its presence in the storage means. Where the word was not previously stored in the storage means, the operator may then be given a prompt to update the storage means accordingly. The operator may modify or update the storage means at any time.

In conjunction with the tracking means, the system may also include means for developing a user profile which itself may be used in subsequent matching processes. For each pattern traced out by the user, the system not only compares the corresponding encoded pattern with previously encoded patterns, it also stores patterns as they are input and notes the corresponding selection by users, thereby building up a stock of historical data forming a user profile. The user profile may, for example, comprise repeated erroneous inputs and the correcting selections thereafter. The benefit of the user profile is that it can be used to automatically correct or complete patterns, without further selection manually input by the user, thus reducing the time required to identify the correct word as intended by the user. The user profile may also take into account the frequency of patterns and corresponding manually selected words and use this data to bias the automatic selection accordingly. Effectively the user profile allows the system to predict final words and may be used in tandem with the ranking system described earlier. The accumulation of data into the user profile may be turned off at any point by the user.

FIG. 6 demonstrates how the word "clever" can be encoded using coding based on a predetermined group of primary directions, for example, the reduced set "up", "down", "left", "right". In FIG. 5 the encoding could, for example, convert the word "clever" into a possible code string "CUUDUR" during run time and can be used to implement the matching with entries in the storage means and predictive text, simply by using directions as inputs. The user starts the text entry by entering the central 1 C key on the remote control or directional keypad (1). The user would most likely be using an on-screen keyboard as a visual aid to help them see which direction the next letter was in the word they wish to enter. The next letter in the word is "L" which is upwards (2) so the user selects the up key and "U" is appended to the stored code. The subsequent letters are entered and encoded as directions in a similar fashion i.e. for "E" (U for UP, 3), "V(D for DOWN, 4), "E" (U for UP, 5). By the time the last letter 'R' in the word "clever" is entered (6), the code becomes CUU-DUR. This code is then used to match the word in the dictionary—in this case "clever"

Note that the set "up", "down", "left" and "right", ie U, D, L, R, referred to above and in subsequent passages in this description and having four primary directions, is merely exemplary. Many other sets of primary directions, including those with greater or fewer members than in the UDLR example, could also be envisaged under this system, such as eight points of the compass, N, NE, E, SE, S, SW, W and NW or any other suitable division of the compass.

The method described earlier works with word data (stored or tracked) based on encodings of a reduced input variable ie matching of real words is based on the similarity of encoded words eg CUUDUR (for "clever") and CUULD (for "cares").

It will be appreciated that when the keys for the word CLEVER have all been actuated, ie when the word is complete, and the code has become, for example, CUUDUR, the matching process may suggest more than one candidate word. This is because the same pattern of translational movements may be formed by tracing out the letters of different words. For example, the words "him" and "gun" are both formed by the same pattern of translational movements (reduced, for example, to CUD) on a QWERTY-type keyboard. Thus, at least initially, both words could be candidate words suggested by the matching process. Indeed, the reduction of translational directions to a small number, eg four primary directions, as described above, will exacerbate this ambiguity, in the sense that, by encoding movements by only four directions, the system discards some information eg that associated with translational movements recorded according to a bearing 0° to 360° (and divisions between these) of its direction.

However, processing codes based on, for example, four values is considerably more efficient and faster than the processing of bearings and the loss of information can be compensated for by various disambiguation techniques as described below.

Ambiguity is also reduced as the number of letters increases—i.e. the choices of possible word matches in the dictionary is inversely dependent on the number of letters in a given word.

The method is very forgiving in the sense that it does not matter where one starts on the keyboard and it does not matter how accurately the selection of an individual key is, so long as the direction of that key from the previous key is roughly correct. This means that it is possible to enter the correct word without touching any of the correct keys at all.

The storage means also contains a dictionary of words sufficient in size to cover all the necessary options that the user may want to choose e.g. maybe 400,000 or more in an English dictionary. This dictionary of words is encoded in a manner which describes each word as a string of directional information pertaining to the particular keyboard layout implemented in the particular device (e.g. QWERTY but not limited to this layout).

The processor comprises a translation means which implements the matching process, by continually comparing the information from the movement as indicated by the tracking means to encoded word data in the storage means to produce a list of likely words. These likely matches can be displayed to the user to allow the user to make a positive selection of the correct word prior to entering every letter in a given word, thus saving time in data entry.

Figure 4:
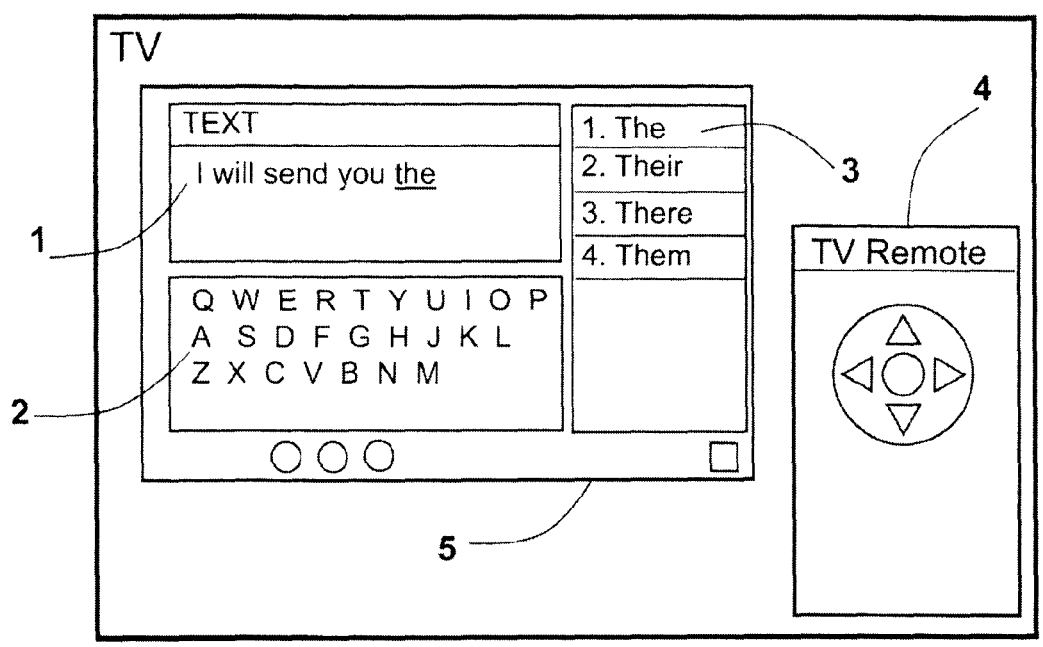
FIG. 4 is a possible implementation of a virtual keyboard layout on a TV.

FIG. 4 illustrates how a regular TV remote control 4 can be used to enter text in a television set 5. Here the UP, DOWN, LEFT, RIGHT arrow keys (4) can be used to enter directional information, using an on screen keyboard layout (2) as a visual aid. At any stage in data entry a word list (3) is displayed allowing early selection of the correct word. The selected text is shown in an area on the TV screen (1).

FIG. 5 shows an embodiment of the invention which uses a remote, passive representation of a keyboard layout, such as a paper printout of a QWERTY keyboard (1) or the projection of a keyboard on a whiteboard or desktop. In this embodiment the keyboard is virtual to the extent that it provides a visualisation of a keyboard, the virtually keys serving as a visual aid when entering text on a PDA or other sort of computer display screen (2).

The user selects a key using a stylus to tap the touchscreen in the approximate relative location of the key in area (3). To enhance accuracy it is possible to indicate keyboard regions on the display. An advantage of using regions of the keyboard in combination with a reduced set of translational directions is that where the typing out of two different real words traces out identical patterns on the keyboard (see "him" and "gun" above), they can be distinguished by the fact that they occur in different regions of the keyboard. Thus, even using patterns entirely consisting of a few primary directions, disambiguation techniques such as this facilitate a reduction of candidate words. Moreover, by "rooting" a pattern in a particular region, the system allows the matching process to identify desired words more efficiently, by providing "approximation" information to cut down the area searched in the storage means.

In the case of the FIG. 5 arrangement there are three regions denoting the three rows of letters on a QWERTY keyboard (3) The user then ensures that e.g. for the letter "T" the stylus taps the top row and for the letter "N" the bottom row (4). At any point in the sequence of letter entry the appropriate word choices are shown (7), and the final text is shown in an area on the screen (6).

Since the proposed invention utilises directional information, it is relatively straightforward to use a limited keyboard, such as the numeric 0-9 keypad on a mobile phone as a surrogate for a full QWERTY keyboard.

In a further embodiment, the movements traced by the tracking means may also be visualised. Every time the actuating means or operator's fingers taps the screen a mark is left to aid in selecting the direction of the next letter (5). The visualisation may include all marks, a predetermined number and may also visualise the actual trace of movements between consecutive actuations.

In FIG. 7 two ways of utilizing a numeric keypad as a surrogate for a larger more complex keyboard such as the QWERTY keyboard are shown. In the numeric keypad (4) the left keys (1,4,7) are mapped to the left direction of the three rows of a QWERTY layout (1) and the keys (3,6,9) are mapped to the right direction of the three rows of the QWERTY layout (11,12,13). To enter the word "patent" for example, the user would press 3 (top row to the right), 4 (middle row to the left), 3,1 (top row to the left), 9 (bottom row to the right), 1. After entering a full word the user would press "0" (5) which could be mapped to the "space" bar of a keyboard. After every key entry predictive software can show the best choices to allow early selection of the correct word.

The numeric keypad in the lower FIG. 3) is an illustration of another approach where the number keys are mapped to different directions in a similar manner to the directional keypad found on remote controls (2). In this case the number "2" on the keypad corresponds to the UP arrow (8), the number "4" corresponds to the LEFT arrow (7), number "8" to the DOWN arrow (6), number "6" to the RIGHT arrow (9), and number "5" to the Centre button (10). A user can simply click on the key corresponding to the direction of the next letter with respect to the previous letter. In this implementation, the method assumes the user is selecting the first letter of a word somewhere in the middle of the keypad (it does not have to do this—the system is robust enough to be independent of location) e.g. around the letters "G" and "H" on a QWERTY keyboard. To again enter the word "patent" one would press 2 (UP), 8 (DOWN), 2 (UP), 4 (LEFT), 8 (DOWN), 2 (UP). Again a particular number on the keypad could be allocated as a delimiter or "space bar" to indicate the end of a word.

Another embodiment of the invention is depicted in FIG. 8. In this embodiment the actuating device itself contains a means for tracking its position, which operates on a remote, passive representation of a keyboard layout, as previously described. The keyboard can be a standard QWERTY keyboard (2) with additional symbols (7) and with a separate number keypad (3). In this case the actuating device is an electronic pen (4) containing a camera (6) and which can communicate wirelessly with the computer. The stylus tip (5) is used to select characters or symbols on the printed keyboard layout (1). The words are shown on the screen (9) as the inputs are processed.

The keyboard can be a simple printout of a QWERTY keyboard or can be enhanced by colour coding different areas or keys or by using different shading patterns. The camera in the electronic pen can be used to determine the position of the pen and be used to determine the directional motion of the pen, either based on recognising the shapes of individual characters and symbols or based on the shades or colours of that area of the keyboard. Movement of the pen can be tracked between the different regions to allow directional information to be used to select the correct words.

Where no actuating device is used and the user moves his finger over the keyboard visualisation, the tracking means may be a means for determining the position of the finger and for identifying virtual key actuations, such as the "touching" or "depression" of the virtual keys, rather than movement above such keys. Such a tracking means may be, for example, a high resolution camera system aligned, toward the keyboard representation and directed to monitor precise hand movements.

The data entry device is not limited to a keyboard or a representation of a keyboard. Because the essence of the invention is relative direction, any device which can measure directional information or directional intention can be used to enter sufficient data to allow selection of a particular word. For example, a TV remote control containing motion sensors (e.g. accelerometers) could be used for entering directional information by simply moving the control up or down or right or left. This motion can be captured by the software and used to select words from the dictionary. The user needs to have knowledge of the particular keyboard layout implemented to allow estimation of the direction of the next letter from the current letter in any particular word. There can be a visual aid to help the user (where necessary—some good typists have an intuitive knowledge of QWERTY keyboard layout and may need no visual cues). The visual aid can be an on-screen keyboard representation in the case of a TV remote control or games console for example.

The invention can be implemented so as to reduce the number of possible word matches at any given point in the sequence of data entry by arranging the letters or symbols on the keyboard in specified regions. For example the keyboard can be divided into three rows—top, middle and bottom, corresponding to the three text rows of a standard QWERTY keyboard as shown in FIG. 7 (1). The user will then be able to reduce ambiguity in word selection by ensuring the tracking means selects the correct row for any given letter as well as the correct direction of the next letter in the word sequence from the current letter.

In a similar manner the keyboard can be divided into columns or quadrants or even overlapping regions. The process remains the same in that positional information can be added to the directional information supplied by the tracking device to improve word selection accuracy.

In accordance with the invention an method may be used with only a reduced number of input variables to represent the translation movements eg the reduced set input set describe earlier: an UP and DOWN key or only a LEFT and RIGHT key used to select words. Such a lean implementation may have application in devices for disabled people e.g. Motor Neurone disease sufferers could use a mouth tube to select words from a QWERTY keyboard on a screen using a mouth tube, where suck=UP and blow=DOWN. In a similar manner, voice command software can be implemented as a data entry mechanism according to the invention, such that the user needs only to say a limited range of commands to enter text e.g. UP, DOWN, LEFT, RIGHT, SPACE. Alternatively the voice commands could be the numbers on a keypad, analogous to the text entry methods as shown in FIG. 7.

The description and explanation provide background information pertaining to the technical field of the present invention and are intended to facilitate the understanding of the present invention. It will, however, be appreciated by those skilled in the art that variations and alterations are possible within the general scope of the invention which is defined in the appended claims.

We claim:

1. A computer-implemented method of translating user input into at least one word having multiple characters, the method comprising:
    displaying a keyboard on a display,
        wherein the keyboard comprises multiple character indicators;
    receiving a sequence of user inputs;
    encoding the sequence of user inputs into a sequence of discrete input directions by selecting, from a set of predetermined primary directions, a discrete direction most closely matching, or exactly matching, each user input; and
    identifying, using the sequence of user inputs, at least one word in a stored dictionary, by matching the sequence of discrete input directions to one or more patterns corresponding to words stored in the dictionary;
    wherein each of the one or more patterns corresponding to a word specifies a sequence of discrete directions from the set of predetermined primary directions;
    wherein each discrete direction in each sequence of discrete directions specifies a relative directional relationship between:
        a position or area of the keyboard associated with a first character of a pair of sequential characters in the word corresponding to that pattern, and
        a position or area of the keyboard associated with a second character of the pair of sequential characters; and
    wherein matching the sequence of discrete input directions to the one or more patterns comprises finding matches between:
        items in the sequence of discrete input directions, and
        items in the sequence of discrete directions corresponding to each of the one or more patterns.

2. The computer-implemented method of claim 1, wherein at least one of the sequence of user inputs is not mapped to a key pressed to indicate that character.

3. The computer-implemented method of claim 1 further comprising:
 displaying, on the display, at least two of the at least one identified words; and
 receiving, from the user, a selection of one of the at least two displayed words.

4. The computer-implemented method of claim 1, wherein encoding the sequence of user inputs into a sequence of discrete input directions includes:
 selecting, for each user input in the sequence of user inputs one or more relative directions, each relative direction being one of: up, down, left, right; or
 identifying a consecutive actuation of a previous position or area of the keyboard.

5. The computer-implemented method of claim 1, wherein the sequence of user inputs is received via a virtual keyboard.

6. The computer-implemented method of claim 1, wherein the sequence of user inputs is received via one or more pushbuttons, a joystick, or a multi-directional input button having eight or fewer distinct directions.

7. The computer-implemented method of claim 1, wherein the sequence of user inputs is based on continuous tracking of a finger on a touch screen.

8. The computer-implemented method of claim 1, wherein the sequence of user inputs is received by tracking a position of an input implement.

9. The computer-implemented method of claim 1, wherein at least one of the characters in the at least one word is not independently discernable from a corresponding user input without reference to the previous user inputs in the sequence of user inputs.

10. The computer-implemented method of claim 1, wherein at least one of the discrete directions in the set of potential discrete directions comprises an indication of a consecutive actuation of the previous position or area of the keyboard.

11. A non-transitory computer readable memory storing instructions configured to, in response to being executed by a computing device, cause the computing device to perform operations for translating user input into at least one word having multiple characters, the operations comprising:
 displaying a keyboard on a display,
  wherein the keyboard comprises multiple character indicators;
 receiving a sequence of user inputs;
 encoding the sequence of user inputs into a sequence of discrete input directions by selecting, from a set of predetermined primary directions, a discrete direction most closely matching, or exactly matching, each user input; and
 identifying, using the sequence of user inputs, at least one word in a stored dictionary, by matching the sequence of discrete input directions to one or more patterns corresponding to words stored in the dictionary;
 wherein each of the one or more patterns corresponding to a word specifies a sequence of discrete directions from the set of predetermined primary directions;
 wherein each discrete direction in each sequence of discrete directions specifies a relative directional relationship between:
  a position or area of the keyboard associated with a first character of a pair of sequential characters in the word corresponding to that pattern, and
  a position or area of the keyboard associated with a second character of the pair of sequential characters; and
 wherein matching the sequence of discrete input directions to the one or more patterns comprises finding matches between:
  items in the sequence of discrete input directions, and
  items in the sequence of discrete directions corresponding to each of the one or more patterns.

12. The computer-readable memory of claim 11, wherein:
 matching the sequence of discrete input directions to one or more patterns corresponding to words stored in the dictionary is performed by:
  matching the sequence of discrete input directions to a first portion of a selected pattern of the one or more patterns corresponding to words stored in the dictionary;
 the first portion of the selected pattern corresponds to characters in the word corresponding to the selected pattern comprising less than all the characters of the word corresponding to the selected pattern; and
 the operations further comprise displaying the matching words.

13. The computer-readable memory of claim 11, wherein the operations further comprise receiving an indication of a start position or area on a virtual keyboard, wherein the sequence of user inputs are received via the virtual keyboard.

14. The computer-readable memory of claim 11, wherein at least one of the characters in the at least one word is not independently discernable from a corresponding user input without reference to the previous user inputs in the sequence of user inputs.

15. A system for translating user input into at least one word having multiple characters, the system comprising:
 a display configured to display a keyboard,
  wherein the keyboard comprises multiple character indicators;
 an input device configured to receive a sequence of user inputs;
 one or more processors; and
 a memory; wherein the processor and the memory are configured to:
  encode the sequence of user inputs into a sequence of discrete input directions by selecting, from a set of predetermined primary directions, a discrete direction most closely matching, or exactly matching, each user input; and
  identify, using the sequence of user inputs, at least one word in a stored dictionary, by matching the sequence of discrete input directions to one or more patterns corresponding to words stored in the dictionary;
  wherein each of the one or more patterns corresponding to a word specifies a relative directional relationship between; A)
   a position or area of the keyboard associated with a first character of a pair of sequential characters in the word corresponding to that pattern, and
   a position or area of the keyboard associated with a second character of the pair of sequential characters; and
  wherein matching the sequence of discrete input directions to the one or more patterns comprises finding matches between:
   items in the sequence of discrete input directions, and
   items in the sequence of discrete directions corresponding to each of the one or more patterns.

16. The system of claim 15:
wherein the multiple character indicators are displayed on virtual keyboard with at least 26 keys,
wherein the virtual keyboard is displayed on a touchscreen, and
wherein the sequence of user input is received via tactile input to the touchscreen.

17. The system of claim 15, wherein the system is incorporated in a computer, a television remote, a gaming device, or a mobile device.

18. The system of claim 15:
wherein each of the multiple character indicators is associated with at least one region, and
wherein encoding the sequence of user inputs into a sequence of discrete input directions includes converting the sequence of user inputs into relative directions based at least in part on a region indicated by each of the user inputs.

19. The system of claim 15, wherein the set of predetermined primary directions includes at least directions corresponding to up, down, left and right.

20. The system of claim 15, wherein at least one of the characters in the at least one word is not independently discernable from a corresponding user input without reference to the previous user inputs in the sequence of user inputs.

21. The system of claim 15, wherein the input device comprises at least one of: a set of push-buttons, a joystick, or a multi-directional input button having eight or fewer distinctly selectable directions.

* * * * *